United States Patent
Chen et al.

(10) Patent No.: US 7,584,031 B2
(45) Date of Patent: Sep. 1, 2009

(54) METHOD FOR DRIVING HEAD LIGHT OF VEHICLES

(75) Inventors: Wei-Gen Chen, Tainan (TW); Ming Shan Kuo, Tainan (TW)

(73) Assignee: TYC Brother Industrial Co., Ltd., Tainan (TW)

( * ) Notice: Subject to any disclaimer, the term of this patent is extended or adjusted under 35 U.S.C. 154(b) by 829 days.

(21) Appl. No.: 11/208,752

(22) Filed: Aug. 23, 2005

(65) Prior Publication Data

US 2007/0050103 A1    Mar. 1, 2007

(51) Int. Cl.
*B60Q 1/08* (2006.01)
*G06F 7/00* (2006.01)

(52) U.S. Cl. .......................................... 701/31; 701/49
(58) Field of Classification Search ........................ None
See application file for complete search history.

(56) References Cited

U.S. PATENT DOCUMENTS

| | | | |
|---|---|---|---|
| 6,305,823 B1 * | 10/2001 | Toda et al. .................. | 362/276 |
| 6,729,749 B2 * | 5/2004 | Kondo et al. ................ | 362/466 |
| 2002/0163814 A1 * | 11/2002 | Hayami et al. .............. | 362/466 |
| 2004/0046508 A1 * | 3/2004 | Ishida ......................... | 315/77 |
| 2004/0090788 A1 * | 5/2004 | Ishida ......................... | 362/467 |
| 2004/0212341 A1 * | 10/2004 | Yamamoto et al. ......... | 318/685 |

FOREIGN PATENT DOCUMENTS

| | | | |
|---|---|---|---|
| DE | 19949896 | * | 1/2001 |
| JP | 2004-98851 | * | 4/2004 |
| JP | 2004-155233 | * | 6/2004 |

* cited by examiner

*Primary Examiner*—Michael J. Zanelli
(74) *Attorney, Agent, or Firm*—Rosenberg, Klein & Lee (57) ABSTRACT

A method for detecting errors in driving device of head light of vehicles utilizes a microprocessor control unit of a main circuit to detect the position of the driving shaft by checking the change of magnetic field or resistance of the driving member and the change of magnetic field or resistance is compared with a pre-set value to decide the position of the driving shaft. The motor is then commanded to drive the driving shaft to the pre-set position. The method detects the position of the head light before the drivers drive the vehicles on the road and if the head light is not in a desired position, the user can adjust the head light position to prevent potential risk on the road.

8 Claims, 9 Drawing Sheets

METHOD FOR DRIVING HEAD LIGHT OF VEHICLES

FIELD OF THE INVENTION

The present invention relates to a method for driving the driving device of head light of vehicles, especially for a method for detecting errors and correcting the positions of the head light to pre-set positions.

BACKGROUND OF THE INVENTION

One of the latest safety devices for vehicles is the Adaptive Front-lighting System (AFS) which allows the head light turns according to needs and the system includes a driving device to turn the head light. A latest driving device known to applicant includes step motor and a sensor connected to the output shaft of the motor, wherein the sensor detects the angle that the output shaft rotates and generates a reference voltage which is compared with a pre-set voltage so as to decide the position of the head light. A control unit is then activate the step motor to rotate the output shaft of the step motor to move the head light to pre-set position. Although errors from the parts or the environment have been considered by the known device, the range of the pre-set voltage does not include method for detecting errors. Therefore, the drivers cannot correct the movement of the head light when errors that are not considered by the device happen. In other words, if the driving device of the head light cannot work functionally and the driving device cannot correct the errors, the drivers take risks to drive.

The present invention intends to provide a method for driving the driving device of the head light and the method provides a detection function to detect errors of the movement of the head light.

SUMMARY OF THE INVENTION

The present invention relates to a method for detecting errors in driving device of head light of vehicles, and the method includes the following steps:

step 1: activating driving device of head light and a main circuit beginning to operate;

step 2: initializing a microprocessor control unit of the main circuit and zeroing the counting condition, the microprocessor control unit detecting parts in the main circuit and making judgement of error;

step 3: judging whether position of driving shaft is detected, if the position of the driving shaft is not detected, a motor being activated to rotate the driving shaft and the counting condition being added by one and stored as record, judging whether the number of the counting condition is over three, if the number of the counting condition is less than three, repeat step 3, if the number is over three, an error judgement is made and the main circuit is stopped;

step 4: the microprocessor control unit obtaining pre-set position and recording the position, the microprocessor control unit obtaining current position of the driving shaft, the pre-set position and the current position being compared, if the result of comparison is different, the motor driving the driving shaft to the pre-set position;

step 5: judging whether the driving shaft is returned to the pre-set position, if the driving shaft is not returned to the pre-set position, the counting condition is added by one and stored as record, judging whether the number of the counting condition is over pre-set times, if the number of the counting condition is less than the pre-set times, repeat steps 3 to 5, if the number is over the pre-set times, an error judgement is made and the main circuit is stopped;

step 6: judging whether the revolution of the motor is in a range of restriction, if the revolution of the motor exceeds the range of restriction, the counting condition is added by one and stored as record, judging whether the number of counting condition is over five, if the number is less than five, repeat steps 2 to 5, if the number is over the pre-set times, an error judgement is made and the main circuit is stopped, and step 7: when completing steps 1 to 6, a driving module of the driving device is set and the driving device is ready to active, the driving device is ready to accept commands from the microprocessor control unit, the main circuit is stopped.

The primary object of the present invention is to provide a method to detect the current position of the head light and the method is able to judge the status of the head light during driving.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
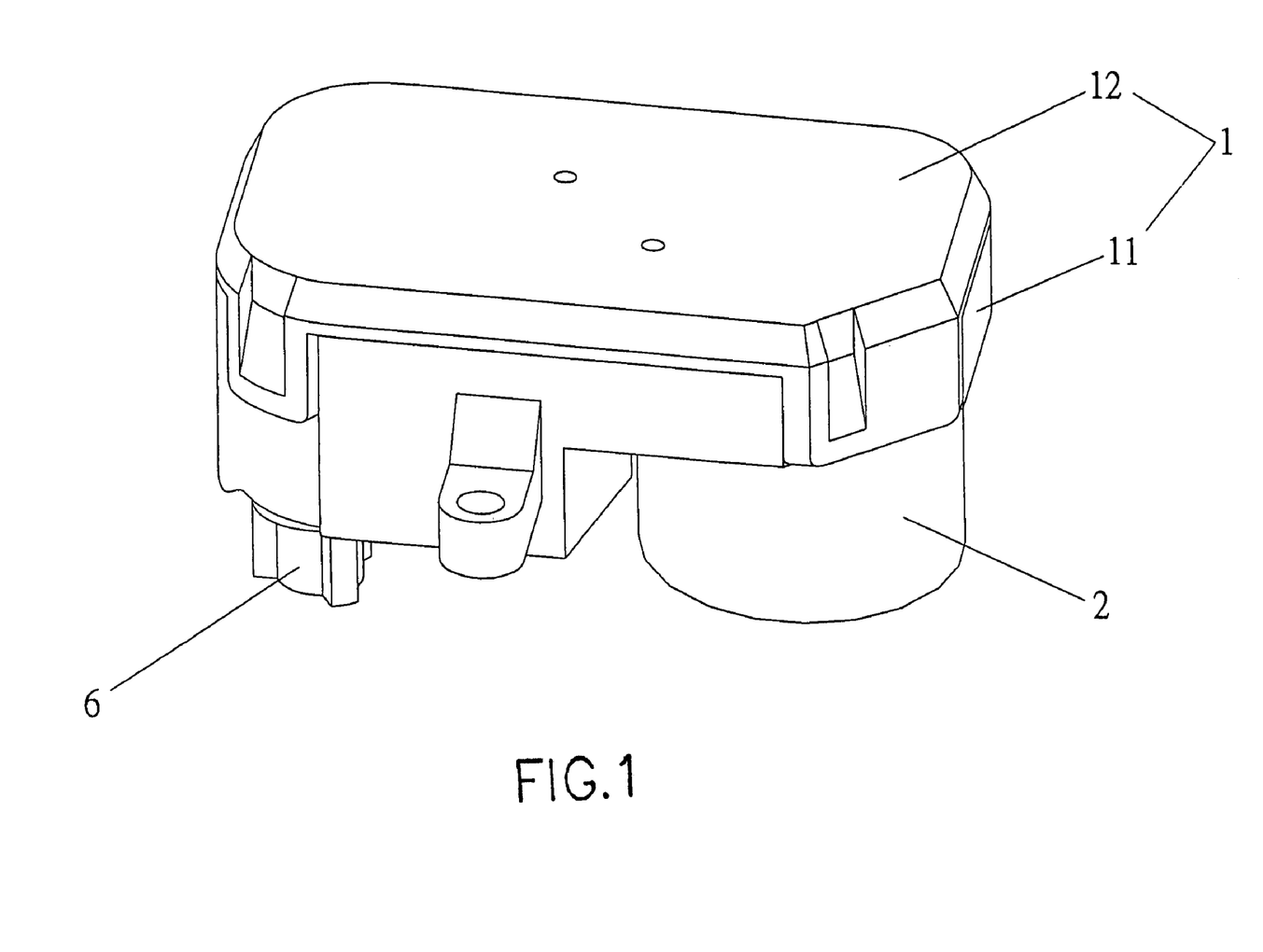
FIG. 1 shows a perspective view of the driving device of head light of the present invention.
Figure 2:
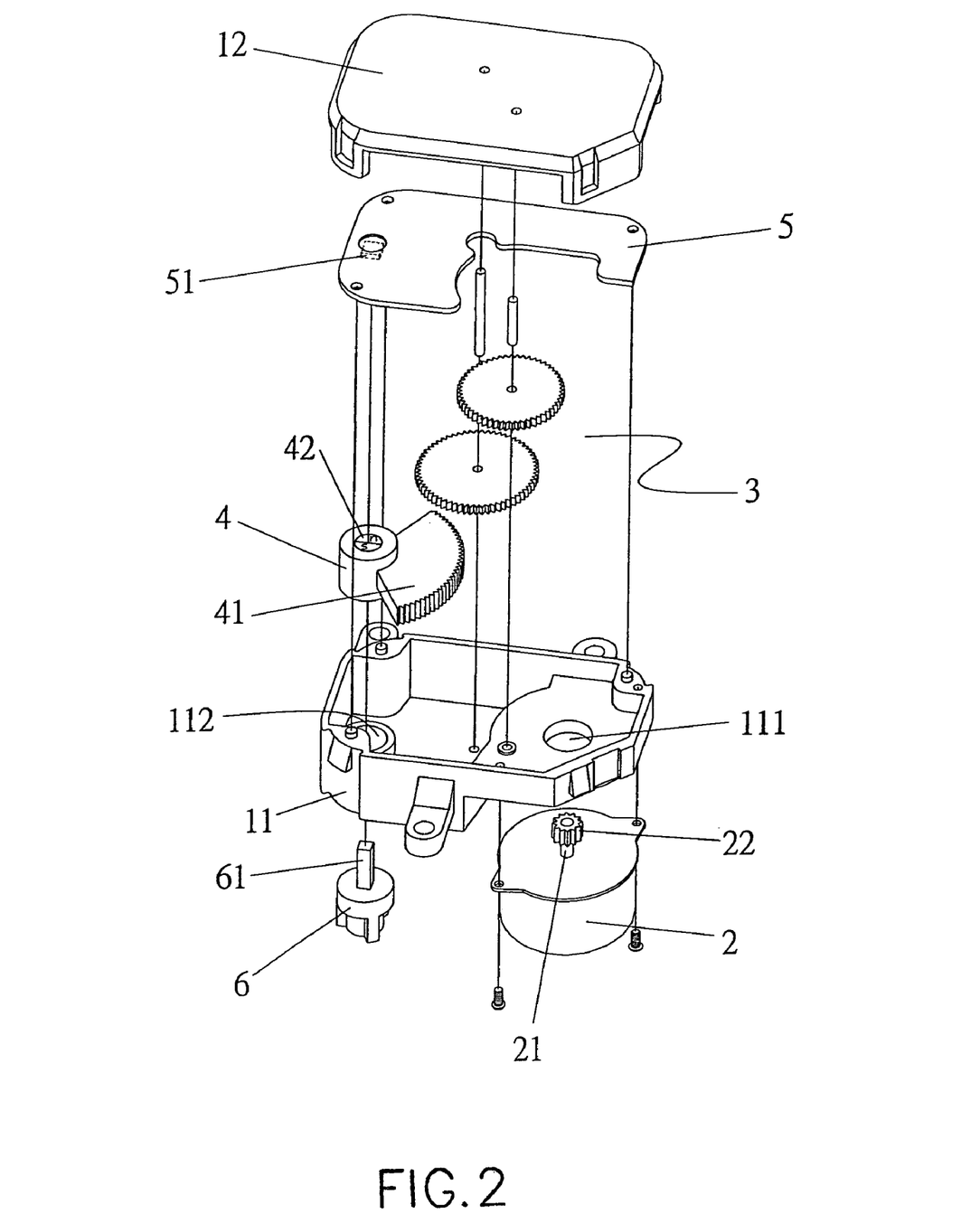
FIG. 2 is an exploded view of the driving device of head light of the present invention.
Figure 3:
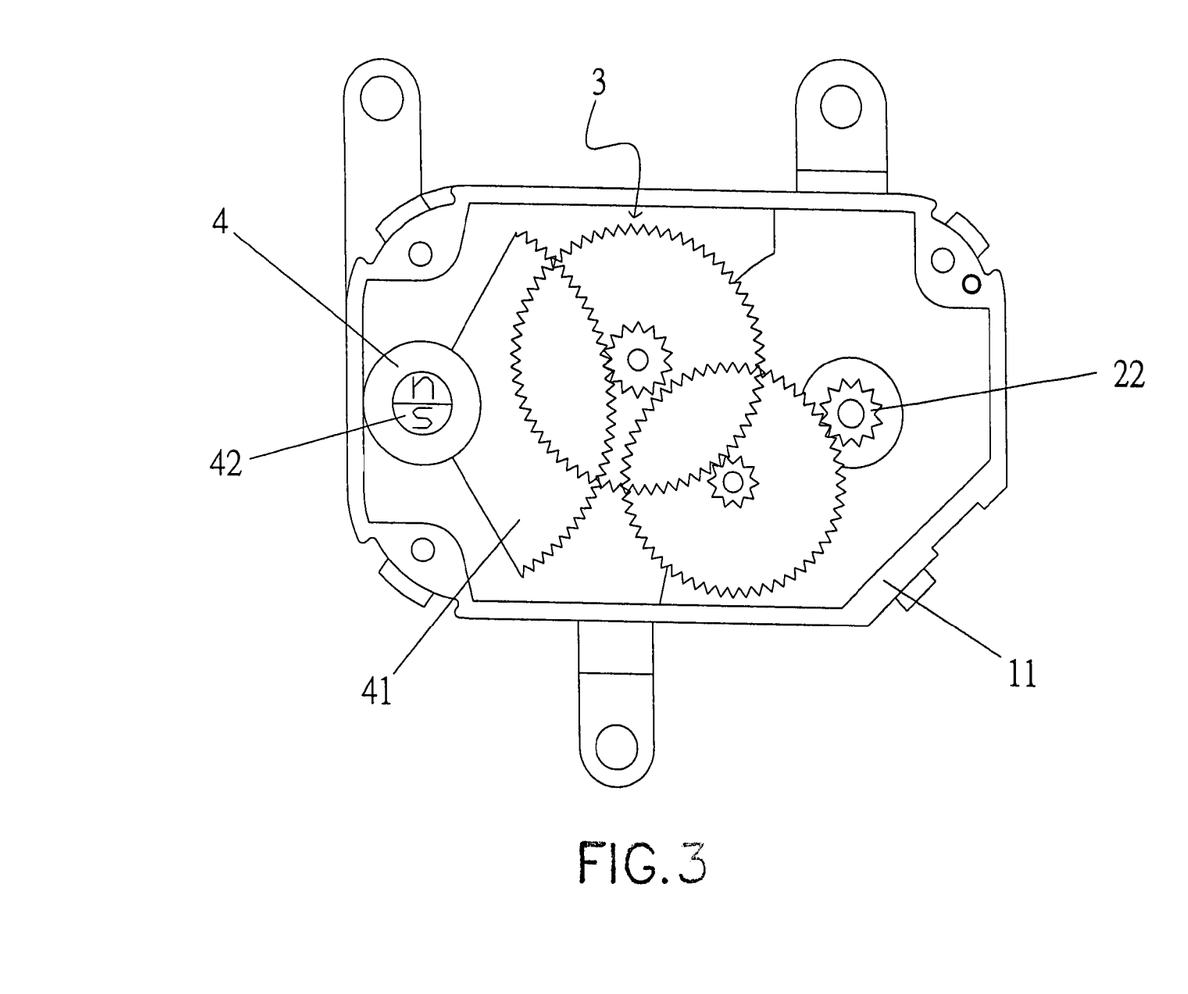
FIG. 3 is a plane view to show that the reduction gear set is engaged with a rack on the driving member.

Referring to FIGS. 1 to 3, the driving device for head light of the present invention comprises a box 1, a motor 2, a reduction device 3, a driving member 4, a circuit board 5 and a driving shaft 6. The box 1 includes a base 11 and a top board 12, wherein the base 11 has a first hole 111 through which the output shaft 21 of the motor 2 extends and a second hole 112 through which the driving shaft 6 extends. The reduction device 3, the driving member 4 and the circuit board 5 are received between the top board 12 and the base 11.

The output shaft 21 has a gear 22 which is engaged with one of the gears of the reduction device 3 and the motor 2 is connected to an underside of the base 11. Therefore, when the output shaft 21 rotates, the reduction device 3 is activated.

The driving member 4 has a fan-shaped rack 41 which is engaged with the reduction device 3 so that the driving member 4 is driven by the reduction device 3 when the motor 2 is activated. A magnet with N pole and S pole is received in one end of the driving member 4 and faces the circuit board 5. The other end of the driving member 4 is connected with the extension 61 of the driving shaft 6. The circuit board 5 has a microprocessor control unit (MCU) and a detection circuit composed of a sensor which is located corresponding to the magnet 42 so that when the driving member 4 rotates, the sensor 51 senses the change of magnetic field and generates a reference number which is sent to the MCU.

When in assembling, the extension 61 of the driving shaft 6 extends through the second hole 112 and is connected to the second end of the driving member 4. The reduction device 3 is then installed in the base 11 and engaged with the gear 22 on the output shaft 21 of the motor 2 and the rack 41 of the driving member 4. The circuit board 5 is installed to the bas 11 and the top board 12 is then mounted to the base 11.

The driving shaft 6 is connected to the head light (not shown) and when the driving member 4 rotates, the sensor of the detection circuit senses the change of magnetic field due to the movement of the magnet 42 in the driving member 4. The change generates a reference number and sent to the MCU to judge the current position of the driving shaft 6. The current position is compared with a pre-set position, if the two positions are different, the motor 2 drives the reduction device 3 to rotate the driving shaft 6 to the pre-set position.

Figure 4:
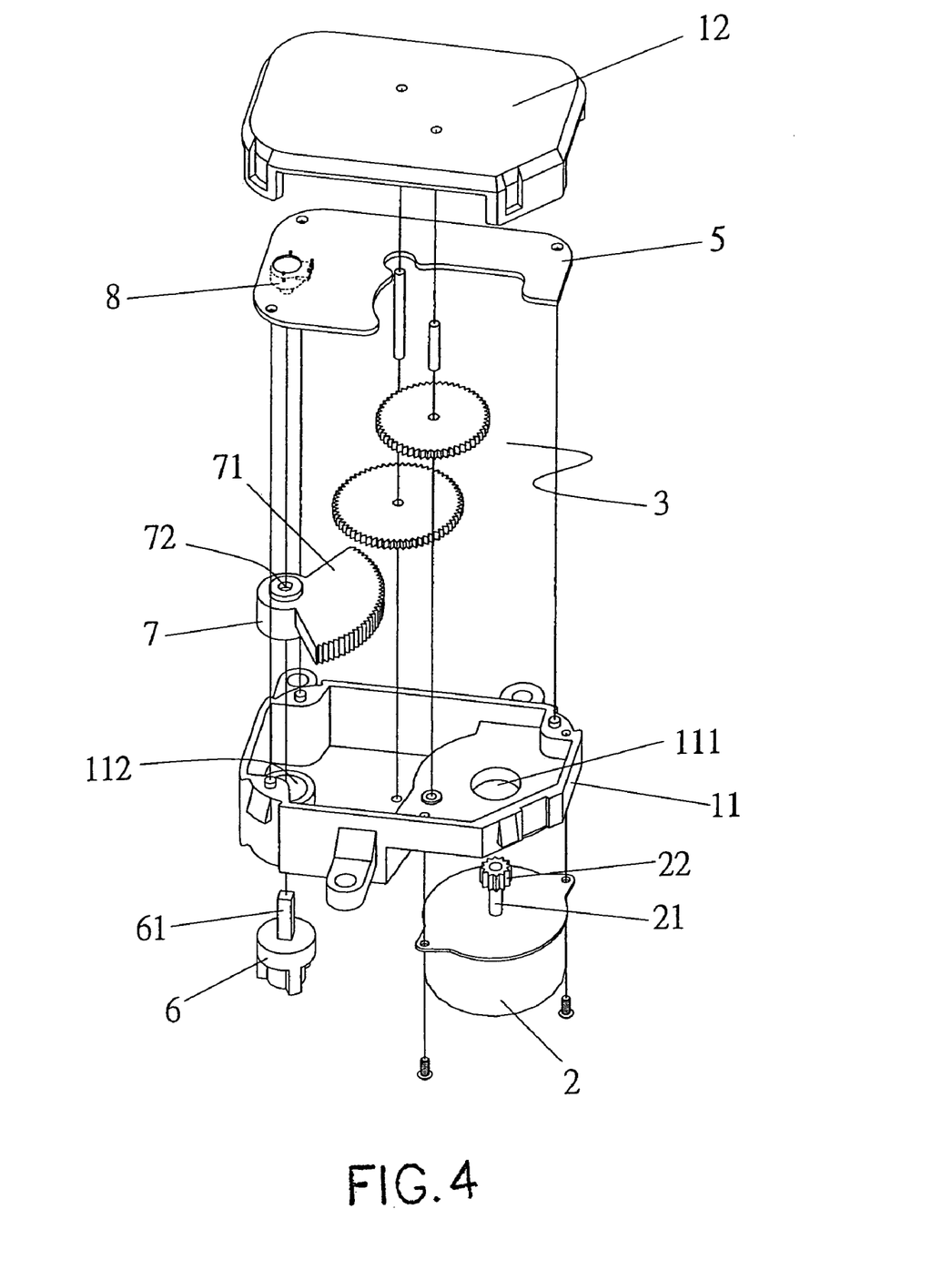
FIG. 4 is an exploded view of another embodiment of the driving device of head light of the present invention.

FIG. 4 shows another embodiment of the driving device, wherein the driving member 7 has a fan-shaped rack 71 which is engaged with the reduction device 3. A hole 72 is defined in an end of the driving member 7 and faces the circuit board 5. The other end of the driving member 7 is connected to the driving shaft 6. The circuit board 5 has a detection circuit composed of a variable resistance 8 which is engaged with the hole 72 of the driving member 7.

When the driving member 7 rotates an angle, the variable resistance changes its resistance value so as to generate a voltage value by which the current position of the driving shaft 6 is detected. The current position is compared with a pre-set position, if the two positions are different, the motor 2 drives the reduction device 3 to rotate the driving shaft 6 to the pre-set position.

Figure 5:
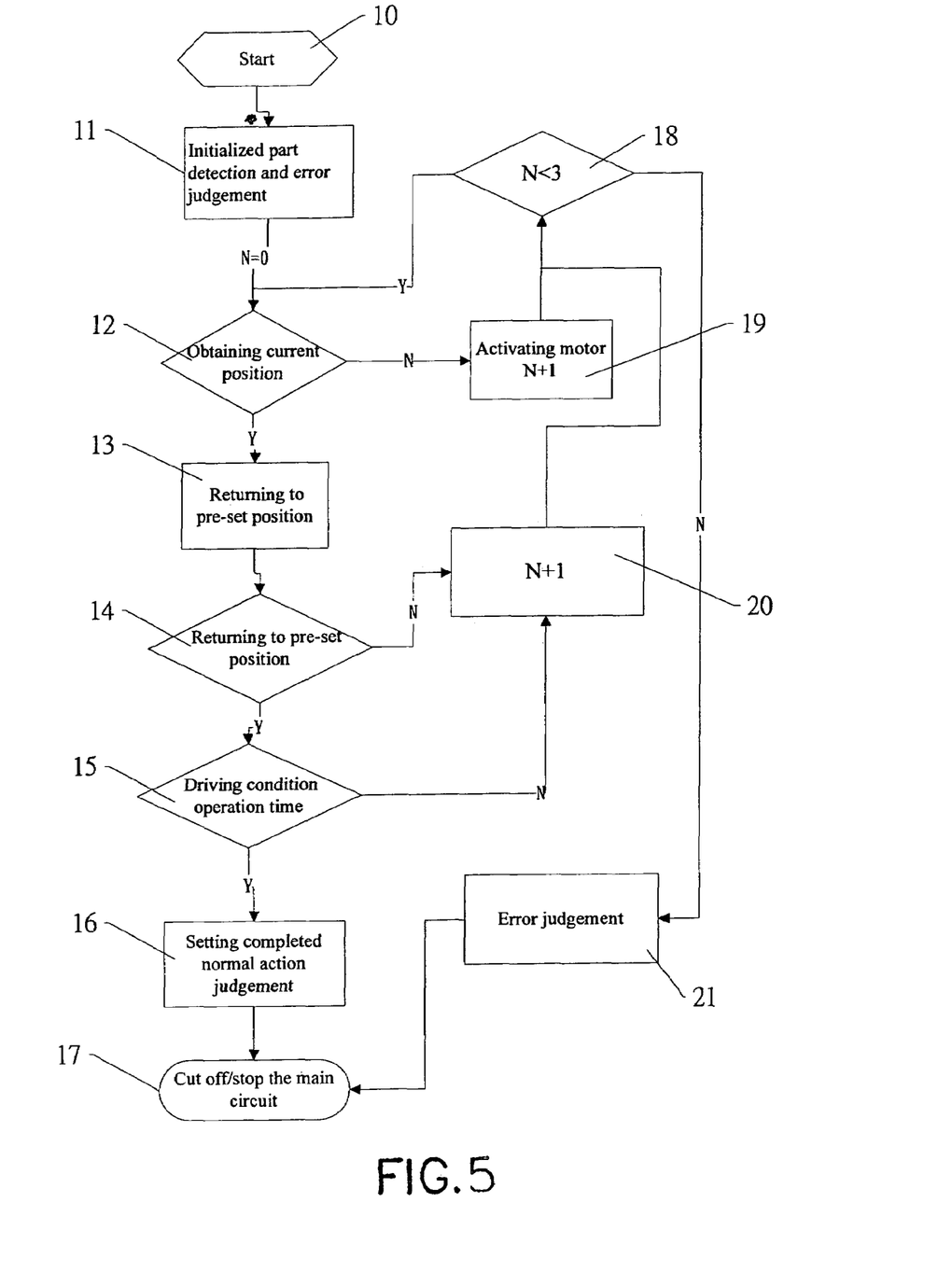
FIG. 5 shows a flow chart of the main circuit of the present invention.

As shown in FIG. 5, which discloses the flow chart of the main circuit of the circuit board 5 and includes the following steps.

step 10 shows that after the driving device of head light is activated, the main circuit begins to operate. The step 11 shows that the microprocessor control unit of the main circuit is initialized and the counting condition is zeroed. The microprocessor control unit also detects parts in the main circuit and making judgement of error.

Step 12 judges the current position of the driving shaft 6, if the current position of the driving shaft 6 cannot be detected, step 18 is activated to activate the motor 2 and the counting condition is added by one and stored as record. In the step 18, judging whether the number of the counting condition is over three which is pre-set, if the number of the counting condition is less than three, the step 12 is repeated, if the number is over three, an error judgement as disclosed in step 21 is made and process step 17 to stop the main circuit. If the current position is detected, then the step 13 is processed.

During the step 13, the microprocessor control unit obtains the pre-set position and records the position. The pre-set position and the current position obtained in step 12 are compared with each other, if the result of comparison is different, the motor 2 drives the driving shaft 6 to the pre-set position. If the two positions are the same, then the step 14 is processed.

Step 14 is to judge whether the driving shaft 6 is returned to the pre-set position, if the driving shaft 6 is not returned to the pre-set position, the counting condition is added by one and stored as record as disclosed in step 20. Step 18 is activated to judge whether the number of the counting condition is over pre-set times which is three, if the number of the counting condition is less than the pre-set times, repeat steps 12 to 14. If the number is over the pre-set times and the driving shaft 6 is not returned to its pre-set position, an error judgement is made as disclosed in step 21 and the main circuit is stopped as disclosed in step 17. On the contrary, if the driving shaft 16 is returned to its pre-set position by the judgement in step 14, then step 15 is processed.

Step 15 is to judge whether the number of the revolution, the operation time or the electric current passing through of the motor is in a range of restriction. If the factor that mentioned above of the motor exceeds the range of restriction, the counting condition is added by one and stored as record as disclosed in step 20. The step 18 judges whether the number of counting condition is over three, if the number is less than three, then repeat steps 12 to 15, if the number is over three, an error judgement is made by step 21 and the step 17 cuts off the main circuit. On the contrary, if the step 15 judges that the number of the counting condition is not exceeded, the process step 16.

When processing the step 16, the driving module of the driving device is set and the driving device is ready to active. The driving device is ready to accept commands from the microprocessor control unit and the step 17 cuts off the main circuit.

Figure 6:
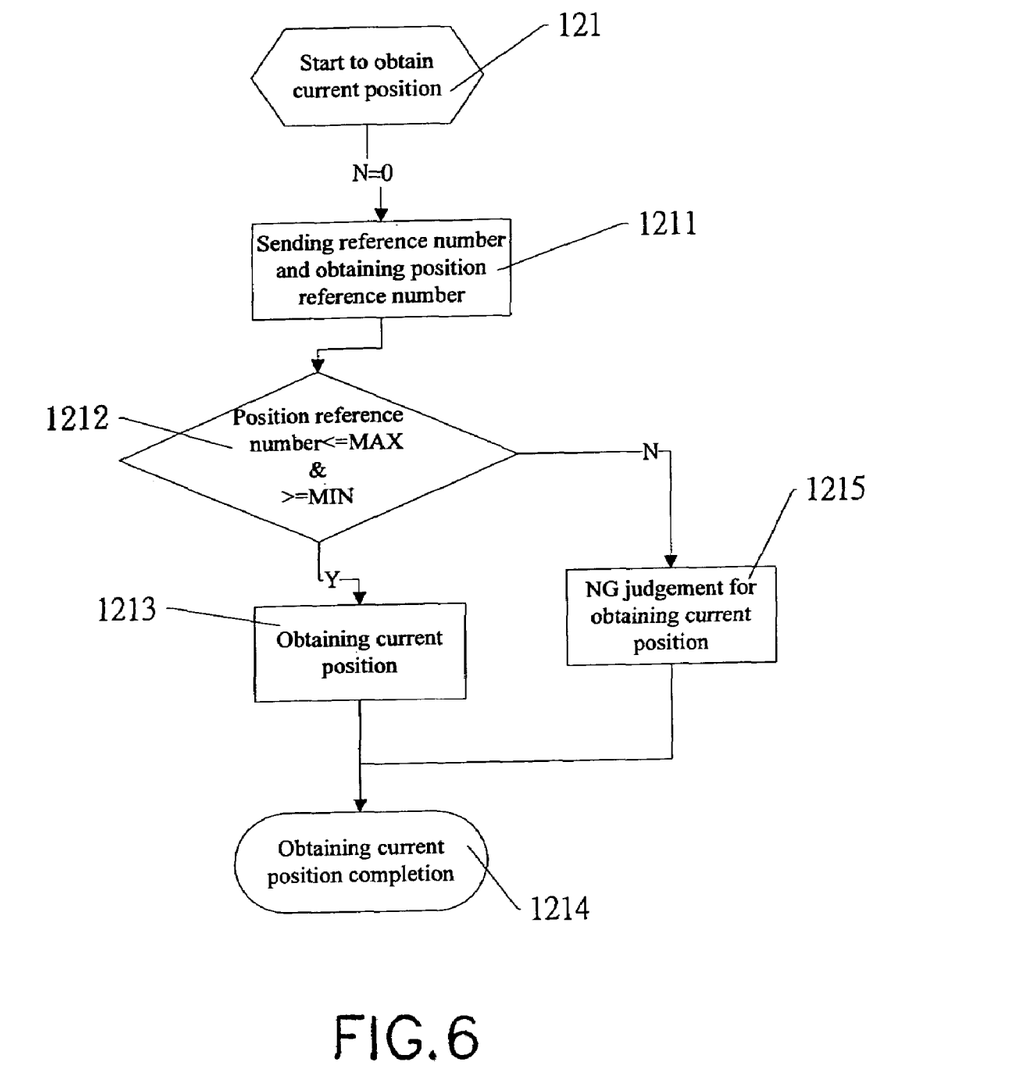
FIG. 6 shows a first method for detecting the current position of the head light.

As shown in FIG. 6, there are three ways to detect the current position of the driving shaft 6, the first way is to use the detection circuit composed of the sensor 51 on the circuit board 5 as shown in FIG. 2 to detect the current position of the driving shaft 6.

When processing the step 12 to obtain the current position of the driving shaft 6, the step 121 is processed in the same to zero the counting condition and the step 1211 is also processed.

In step 1211, the sensor 51 detects a change of magnetic field of a magnet 42 in a driving member 4 so as to obtain a conference number which is sent to the MCU and transferred into a position reference number. After the step 1211 is completed, the step 1212 is processed wherein the transferred position reference number is compared with pre-set position reference number to judge if a result of the comparison exceeds a pre-set range of the position reference number. If the result of comparison is within the range of the pre-set position reference number, the current position of the driving shaft 6 is obtained by the step 1213 and the step 1214 eliminates the processes for obtaining the current position and the main circuit process in step 13 as shown in FIG. 5 starts. On the contrary, if the result of comparison is not located within the range of the pre-set position reference number, an error judgement is made by the step 1215 and the step 1214 eliminates the processes for obtaining the current position and the main circuit process in step 19 as shown in FIG. 5 starts.

Figure 7:
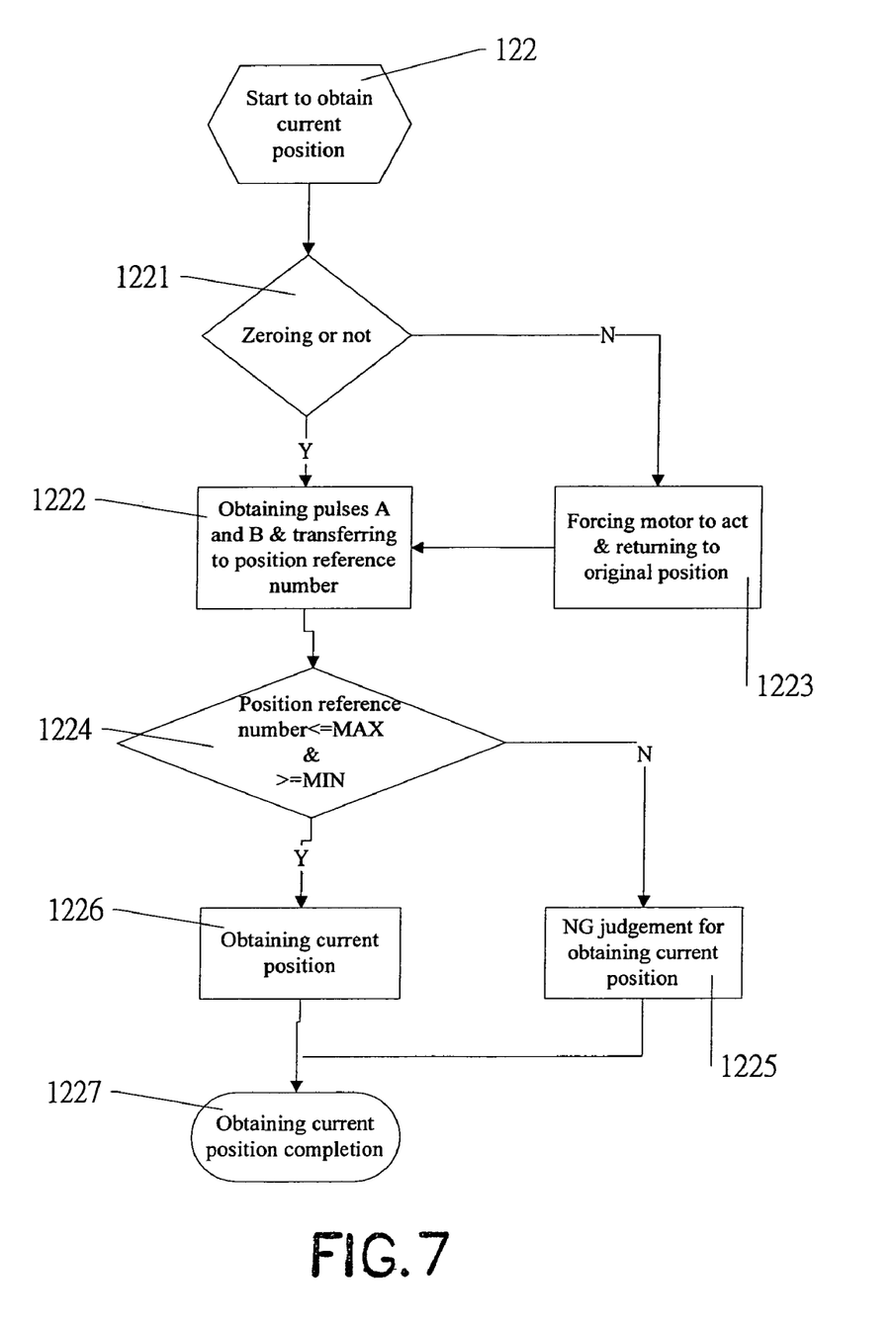
FIG. 7 shows a second method for detecting the current position of the head light.

As shown in FIG. 7, the second way for obtaining the current position of the driving shaft 6 uses a detection circuit composed of a sensor 51 of the circuit board 5 as shown in FIG. 2 and a quadrature A/B circuit. The quadrature circuit generates a pulse "A" and a pulse "B" with a phase angle difference, if the pulse "A" leads a phase angle 90 degrees from the pulse "B", the a first pre-set process is processed. If the pulse "B" leads a phase angle 90 degrees from the pulse "A", a second pre-set process is processed.

When processing the step 12 to obtain the current position of the driving shaft 6, the step 122 is processed in the same to zero the counting condition and the step 1221 is also processed.

The step 1221 judges whether the driving shaft 6 is returned to its pre-set position which is the original position, if the driving shaft 6 did not returned to the pre-set position in the record of the MCU, step 1223 is activated to activate the motor 2 to drive the driving shaft 6 back to its original position. This is recorded in the MCU and step 1222 begins to process. On the contrary, if the driving shaft 6 has been returned to the original position, then the step 1222 is processed.

In the step 1222, the angular movement of the magnet 42 results in a change of magnetic field and the change generates a reference number which is sent to the quadrature circuit to generate the pulses "A" and "B" with a phase difference. The signal is sent to the MCU which transfers the signal into position reference number and the position reference number is recorded.

When the step 1222 is completed, the step 1224 is activated and the transferred position reference number is compared with pre-set position reference number to judge if a result of the comparison exceeds a pre-set range of the position reference number. The range is composed of different position references numbers collected by the angular movements of the magnet 42. Each angular movement generates a change of magnetic field which is transferred to the MCU and transferred to different positioning reference numbers. If the result of comparison is within the range of the pre-set position reference number, the current position of the driving shaft is obtained by the step 1226. The step 1227 eliminates the processes for obtaining the current position and the main circuit process in step 13 as shown in FIG. 5 starts. On the contrary, if the result of comparison is not located within the range of the pre-set position reference number, an error judgement is made by the step 1225 for the obtaining current position of the driving shaft. The step 1227 eliminates the processes for obtaining the current position and the main circuit process in step 19 as shown in FIG. 5 starts.

Figure 8:
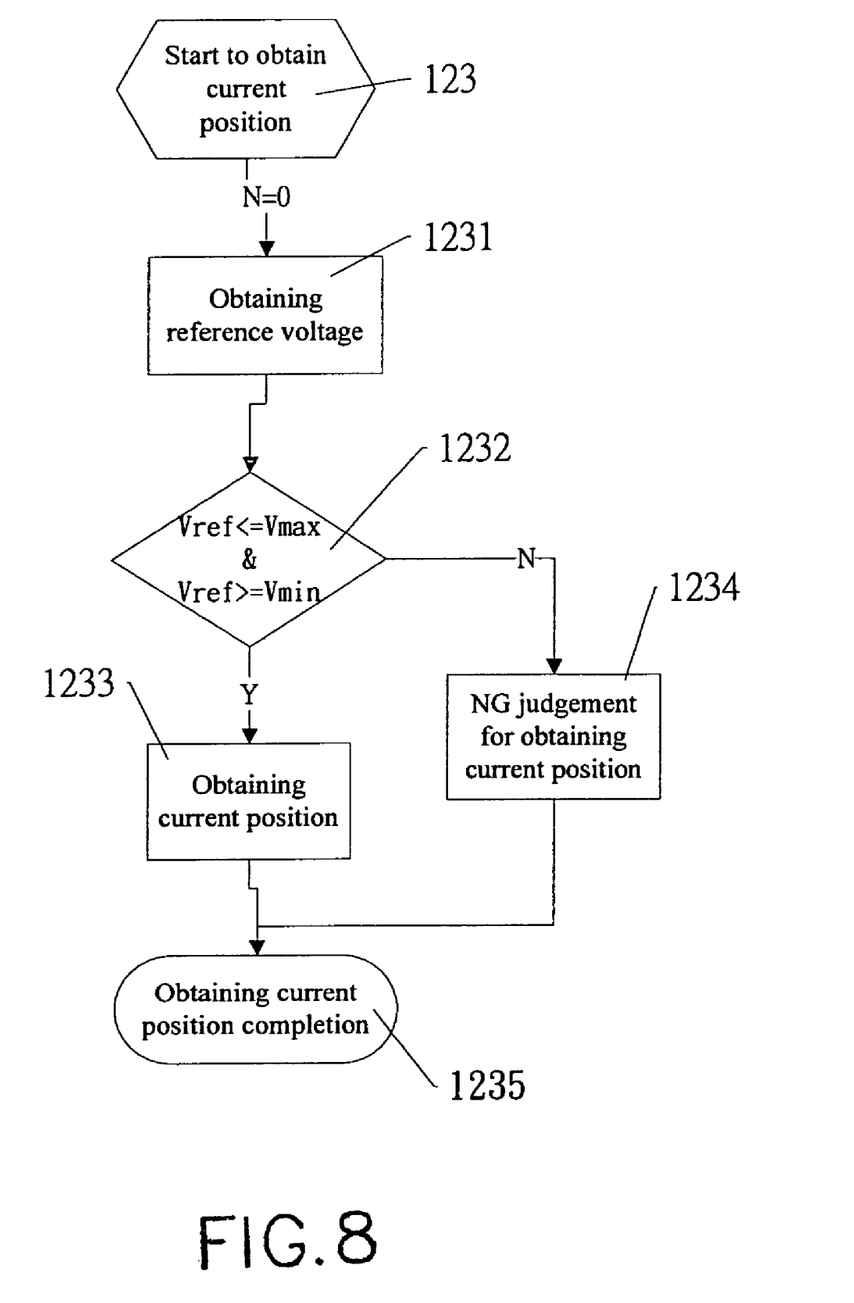
FIG. 8 shows a third method for detecting the current position of the head light.

As shown in FIG. 8, the third way to obtain the current position of the driving shaft 6 uses a detection circuit composed of a variable resistance 8 on the circuit board 5 as shown in FIG. 4 to detect the current position of the driving shaft 6.

When processing the step 12 to obtain the current position of the driving shaft 6, the step 123 is processed in the same to zero the counting condition and the step 1231 is also processed.

When processing the step 1231, the MCU obtains the reference voltage which comes from the change of the resistance of the variable resistance 8 when the driving member 7 rotates.

After the reference voltage is obtained in step 1231, step 1232 is processed and the reference voltage is compared with pre-set voltage to judge if a result of the comparison exceeds a pre-set range of the voltage, if the result of comparison is within the range of the pre-set voltage, the current position of the driving shaft 6 is obtained, and the step 1235 eliminates the process for obtaining the current position and the main circuit process as disclosed in step 13 as shown in FIG. 5 begins. If the result of comparison is not located within the range of the pre-set voltage, an error judgement is made for the current position of the driving shaft 6 by step 1234 and the step 1235 eliminates the process for obtaining the current position and the main circuit process as disclosed in step 13 as shown in FIG. 5 begins.

The method for returning the driving shaft 6 back to its pre-set position in step 13 as disclosed in FIG. 5 is described hereinafter.

Figure 9:
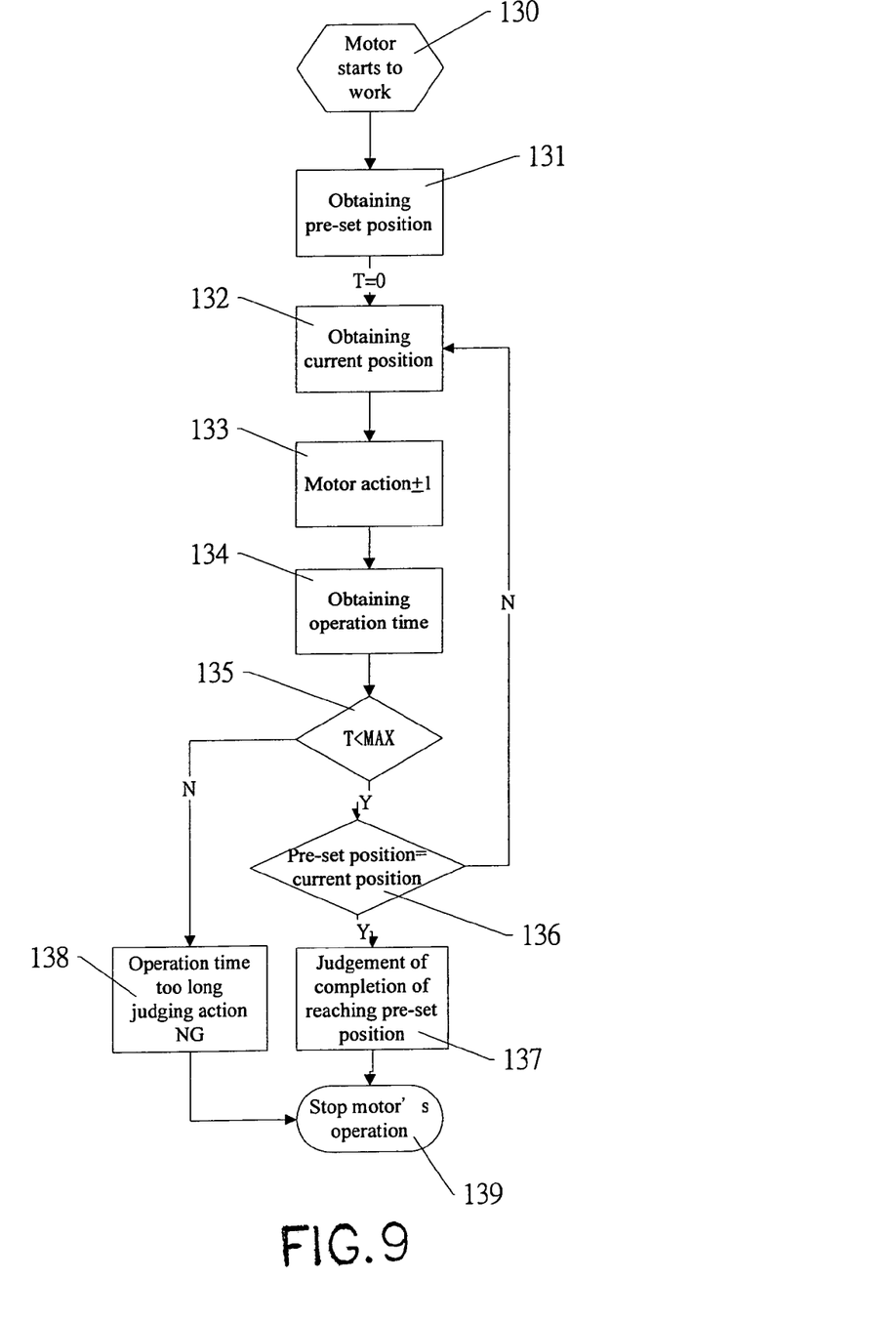
FIG. 9 shows the flow chart to illustrate that the driving shaft is moved back to original position.

As shown in FIG. 9, after the main circuit process obtains the current position of the driving shaft 6 in step 12, the step 130 is activated to activate the motor 2 to drive the driving shaft 6 back to its pre-set position.

Then the step 131 begins to obtain a pre-set position from the MCU and records the pre-set position, the counting condition is zeroed.

Then the step 132 records the current position of the driving shaft 6 and the current position can be obtained by the methods mentioned above.

Then the step 133, the current position and the pre-set position are compared, if the two positions are not the same, the motor 2 is activated one more action or the motor reduces one action. In other words, the motor 2 rotates an angle clockwise or counter clockwise to drive the driving shaft 6.

Then the step 134, the MCU records the operation time of the motor 2.

Then the step 135 compares the operation time of the motor 2 recorded in step 134 and the pre-set period of time of the operation of the motor 2, if the actual operation time is longer than the pre-set period of time of the motor 2, the step 138 judges that the motor 2 operates too long and the step 139 stops the operation of the motor 2. The main circuit process in step 14 as shown in FIG. 5 starts. On the contrary, if the actual operation time is shorter than the pre-set period of time of the motor 2, the step 136 judges that the driving shaft 6 is in its pre-set position. If the driving shaft 6 has not yet arrived its pre-set position, then steps 132 to 136 are repeated to drive the motor 2. If the driving shaft 6 has arrived its pre-set position, then step 137 judges that the action is completed and the step 139 stops the motor 2 and the main circuit process in step 14 as shown in FIG. 5 starts.

The present invention provides thee ways to detect the current position of the driving shaft so that the users have different options to detect the driving shaft. After the driving device is activated, the users know that the status of the driving device, if an error is detected, the users can correct it before driving on the roads.

While we have shown and described the embodiment in accordance with the present invention, it should be clear to those skilled in the art that further embodiments may be made without departing from the scope of the present invention.

What is claimed is:

1. A method for detecting errors in a driving device of a headlight of a vehicle, comprising:

step 1: activating the driving device of the headlight and a main circuit beginning to operate;

step 2: initializing a microprocessor control unit of the main circuit and zeroing a count, the microprocessor control unit detecting parts in the main circuit and making a judgment of error;

step 3: judging whether a position of a driving shaft is detected, if the position of the driving shaft is not detected, a motor being activated to rotate the driving shaft and the count is incremented by one and stored, judging whether the number of the count is over three, if the count is less than three, step 3 is repeated, if the count is over three, an error judgment is made and the main circuit is stopped;

step 4: the microprocessor control unit obtaining a pre-set position and recording the position, the microprocessor control unit obtaining a current position of the driving shaft, the pre-set position and the current position being compared, if the result of the comparison is different, the motor drives the driving shaft to the pre-set position;

step 5: judging whether the driving shaft is returned to the pre-set position, if the driving shaft is not returned to the pre-set position, the count is incremented by one and stored, judging whether the count is over a pre-set count, if the count is less than the pre-set count, steps 3 to 5 are repeated, if the count is over the pre-set count, an error judgment is made and the main circuit is stopped;

step 6: judging whether the revolution of the motor is in a range of restriction, if the revolution of the motor exceeds the range of restriction, the count is incremented by one and stored, judging whether the count is over five, if the count is less than five, steps 2 to 5 are repeated, if the count is over the pre-set count, an error judgment is made and the main circuit is stopped, and step 7: after completing steps 1 to 6, a driving module of the driving device is set and the driving device is ready to be activated, the driving device is ready to accept commands from the microprocessor control unit, the main circuit is stopped.

2. The method as claimed in claim 1, wherein a circuit for judging whether position of driving shaft is detected in step 3 is composed of a sensor, the sensor detects a change of a magnetic field of a magnet in a driving member to obtain a reference number which is converted into a position reference number, the position reference number is compared with a pre-set position reference number to judge if a result of the comparison exceeds a pre-set range of the position reference number, if the result of comparison is within the range of the pre-set position reference number, the current position of the driving shaft is obtained, if the result of comparison is not located within the range of the pre-set position reference number, an error judgment is made for the current position of the driving shaft, the main circuit is stopped.

3. The method as claimed in claim 1, wherein a circuit for judging whether the position of a driving shaft is detected in step 3 is composed of a sensor and a quadrature circuit, the motor drives the driving shaft to an original position and the sensor detects a change of a magnetic field of a magnet in a driving member to obtain a reference number which is sent to the quadrature circuit, the quadrature circuit generates a pulse "A" and a pulse "B" with a phase angle difference and the microprocessor control unit converts the two pulses into a position reference number, the position reference number is compared with a pre-set position reference number to judge if a result of the comparison exceeds a pre-set range of the position reference number, if the result of the comparison is within the range of the pre-set position reference number, the current position of the driving shaft is obtained, if the result of the comparison is not located within the range of the pre-set position reference number, an error judgment is made for the current position of the driving shaft, the main circuit is stopped.

4. The method as claimed in claim 1, wherein a circuit for judging whether the position of a driving shaft is detected in step 3 is composed of a variable resistance, the driving member is rotated to cause a change of resistance of the variable resistance and a reference voltage is generated which is compared with a pre-set voltage to judge if a result of the comparison exceeds a pre-set range of the voltage, if the result of comparison is within the range of the pre-set voltage, the current position of the driving shaft is obtained, if the result of comparison is not located within the range of the pre-set voltage, an error judgment is made for the current position of the driving shaft, the main circuit is stopped.

5. The method as claimed in claim 1, wherein a method for driving the driving shaft to the pre-set position includes the microprocessor control unit obtaining the pre-set position and the current position of the driving shaft, the pre-set position and the current position of the driving shaft being compared with each other, and if the pre-set position and the current position are not the same, the motor is activated to rotate the driving shaft to the pre-set position, a pre-set period of time of operation of the motor being set, and if a period of time that the motor activates is longer than the per-set period of time, the motor being stopped, if a period of time that the motor activates is shorter than the per-set period of time, a check being made as to whether the driving shaft reaches the pre-set position, and if the driving shaft reaches the pre-set position, a completion of the action being made and the motor being stopped.

6. The method as claimed in claim 1, wherein the count in step 3 is set to a value of three.

7. The method as claimed in claim 1, wherein the count in step 5 is set to a value of three.

8. The method as claimed in claim 1, wherein the count in step 6 is set to a value of three.

* * * * *